United States Patent
Jefferson

(10) Patent No.: US 9,547,479 B2
(45) Date of Patent: Jan. 17, 2017

(54) METHOD FOR ADAPTING GUI-BASED INSTRUMENT COMPONENTS IN A VISUAL PROGRAMMING LANGUAGE

(71) Applicant: Keysight Technologies, Inc., Minneapolis, MN (US)

(72) Inventor: Stanley T. Jefferson, Palo Alto, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/673,595

(22) Filed: Mar. 30, 2015

(65) Prior Publication Data

US 2016/0291944 A1  Oct. 6, 2016

(51) Int. Cl.
*G06F 9/44* (2006.01)
*G06F 3/0484* (2013.01)

(52) U.S. Cl.
CPC ............. *G06F 8/34* (2013.01); *G06F 3/04842* (2013.01); *G06F 3/04847* (2013.01); *G06F 8/20* (2013.01)

(58) Field of Classification Search
None
See application file for complete search history.

(56) References Cited

U.S. PATENT DOCUMENTS

| | | | |
|---|---|---|---|
| 5,732,277 A * | 3/1998 | Kodosky | G01R 31/31912 715/759 |
| 5,784,275 A | 7/1998 | Sojoodi | |
| 7,076,411 B2 | 7/2006 | Santori | |
| 8,812,976 B2 | 8/2014 | Kollin | |
| 2002/0055834 A1* | 5/2002 | Andrade | G06F 11/263 703/27 |
| 2002/0120459 A1* | 8/2002 | Dick | G06Q 10/06316 705/7.26 |
| 2003/0038842 A1* | 2/2003 | Peck | G06F 11/263 715/763 |
| 2003/0132962 A1* | 7/2003 | Santori | G06F 9/4443 715/762 |
| 2005/0005102 A1* | 1/2005 | Meggitt | G06F 8/63 713/164 |
| 2007/0093994 A1* | 4/2007 | Kodosky | G06F 8/34 703/2 |
| 2007/0234284 A1* | 10/2007 | Tanner | G06F 8/20 717/109 |
| 2008/0147371 A1 | 6/2008 | Gupton | |

(Continued)

*Primary Examiner* — Chameli Das

(57) ABSTRACT

A method of operating a data processing system running a visual programming language program development system to represent an instrument having a plurality of controls disposed in a layout pattern relative to one another in a visual program. The instrument block that corresponds to the instrument includes a GUI control panel display having a plurality of virtual controls and a connection region. Each virtual control causing the instrument to execute a function that alters the physical state of the instrument. The connection region is associated with the GUI control panel display. The connection region has a pin that is associated with one of the virtual controls and provides a programming interface for connections to other pins in the visual program. The association between the one of the virtual controls and the pin is provided in response to user input during a design phase of the program.

14 Claims, 5 Drawing Sheets

(56) References Cited

U.S. PATENT DOCUMENTS

| | | | |
|---|---|---|---|
| 2011/0078662 A1* | 3/2011 | Hudson, III | G06F 11/362 |
| | | | 717/125 |
| 2012/0005621 A1* | 1/2012 | Kollin | G06F 17/5054 |
| | | | 715/781 |
| 2012/0248197 A1* | 10/2012 | Soule, III | G06F 8/63 |
| | | | 235/472.02 |
| 2013/0232466 A1* | 9/2013 | Hudson, III | G06F 8/20 |
| | | | 717/105 |
| 2014/0258968 A1* | 9/2014 | Brown | G06F 17/21 |
| | | | 717/103 |
| 2014/0317599 A1* | 10/2014 | Graf | G06F 8/34 |
| | | | 717/121 |
| 2015/0193120 A1* | 7/2015 | Leventhal | G06F 3/04817 |
| | | | 715/765 |

* cited by examiner

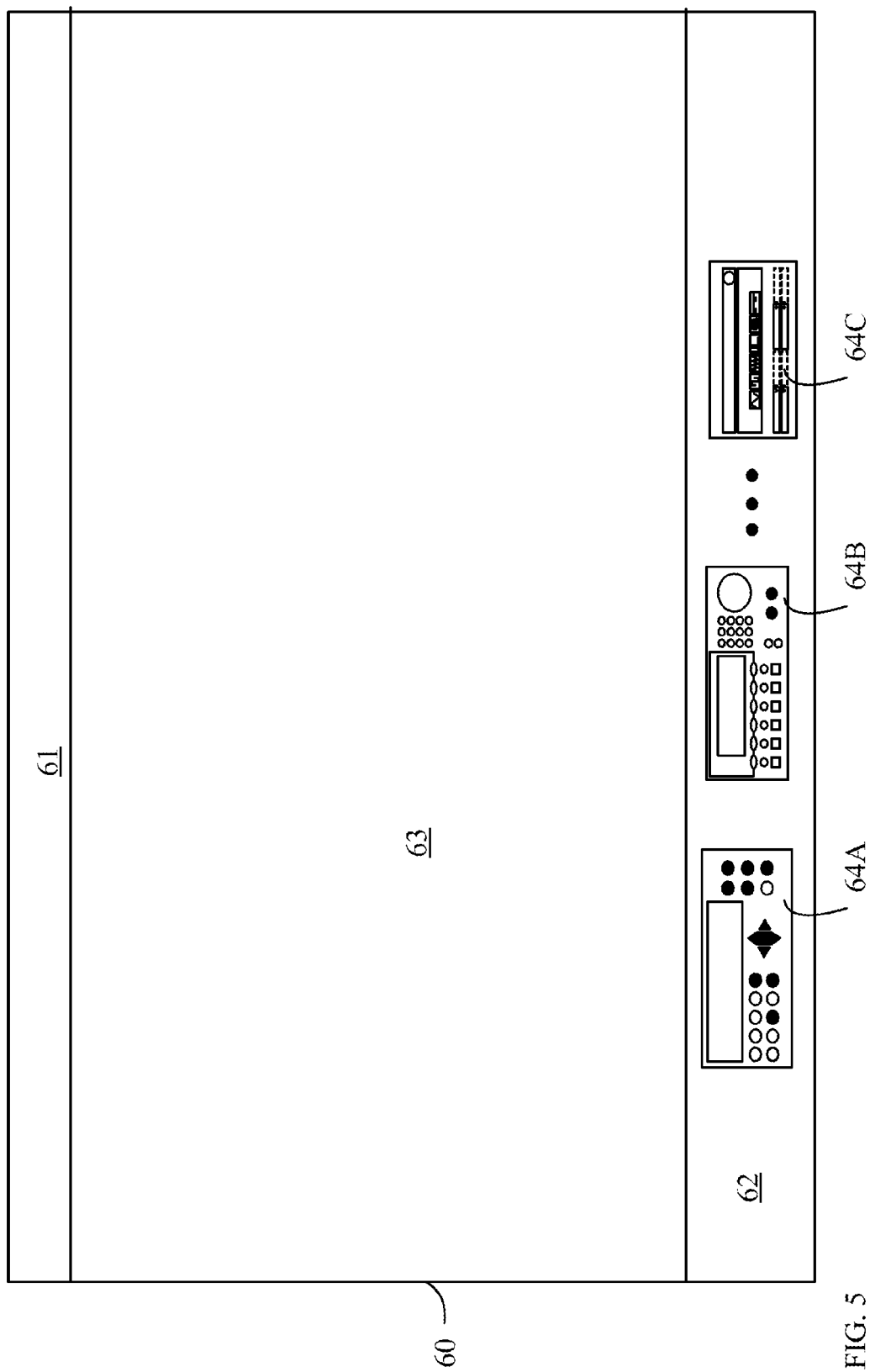

METHOD FOR ADAPTING GUI-BASED INSTRUMENT COMPONENTS IN A VISUAL PROGRAMMING LANGUAGE

BACKGROUND

Modern measurement instruments typically include software interfaces that allow the instruments to be controlled from a computer that is remote from the instrument via a communication link such as a local area network or serial communication link. In its simplest form, the remote software displays a virtual instrument control panel and allows the user to set the various controls by interacting with the controls on the virtual control panel. Automation of a measurement in which different control values are required to be sequenced in some order requires skills that are not necessarily in the skill set of the laboratory personnel who are making the measurements.

SUMMARY

The present invention includes a method of operating a data processing system running a visual programming language development system to represent an instrument having a plurality of controls disposed in a layout pattern relative to one another in a visual program. The method includes providing an instrument block corresponding to the instrument. The instrument block includes a graphical user interface (GUI) control panel display and a connection region. The GUI control panel display has a plurality of virtual controls, each virtual control causing the instrument to execute a function that alters the physical state of the instrument. The connection region is associated with the GUI control panel display. The connection region has a pin that is associated with one of the virtual controls and provides a programming interface for connections to other pins in the visual program. The association between the one of the virtual controls and the pin is provided in response to user input during a design phase of the program.

In one aspect of the invention, the connection region includes a first sub-region for pins that are associated with inputs to the instrument block and a second sub-region displaced from the first sub-region for pins that are associated with outputs from the virtual instrument.

In another aspect of the invention, the instrument block further includes a compact instrument block display in which the instrument block is represented by an icon having the pins but missing the GUI control panel display, the compact instrument block display is utilized in response to user input and the compact instrument block display requires less area on the development system than the instrument block.

In a still further aspect of the invention, one of the virtual controls that is not associated with one of the pins can be manipulated by a user interacting with the virtual control, the virtual control changing a corresponding physical parameter on the instrument.

In another aspect of the invention, the instrument includes a physical control panel having a plurality of physical controls and wherein the plurality of virtual controls in the GUI control panel display has one virtual control for each of the physical controls.

In a still further aspect of the invention, the physical controls are arranged in a pattern with respect to one another on the instrument, and the virtual controls are arranged in substantially the same pattern.

In a still further aspect of the invention a physical instrument that is to be controlled through the instrument block can be controlled separately through multiple instances of the instrument block, each of the instances of the instrument block referencing a set of control parameters that determine a state of the physical instrument, each instance of the instrument block updating the set of control parameters.

BRIEF DESCRIPTION OF THE DRAWINGS

FIG. 5 illustrates an exemplary layout screen for a visual programming language that utilizes the instrument representations of the present invention.

DETAILED DESCRIPTION

Figure 1:
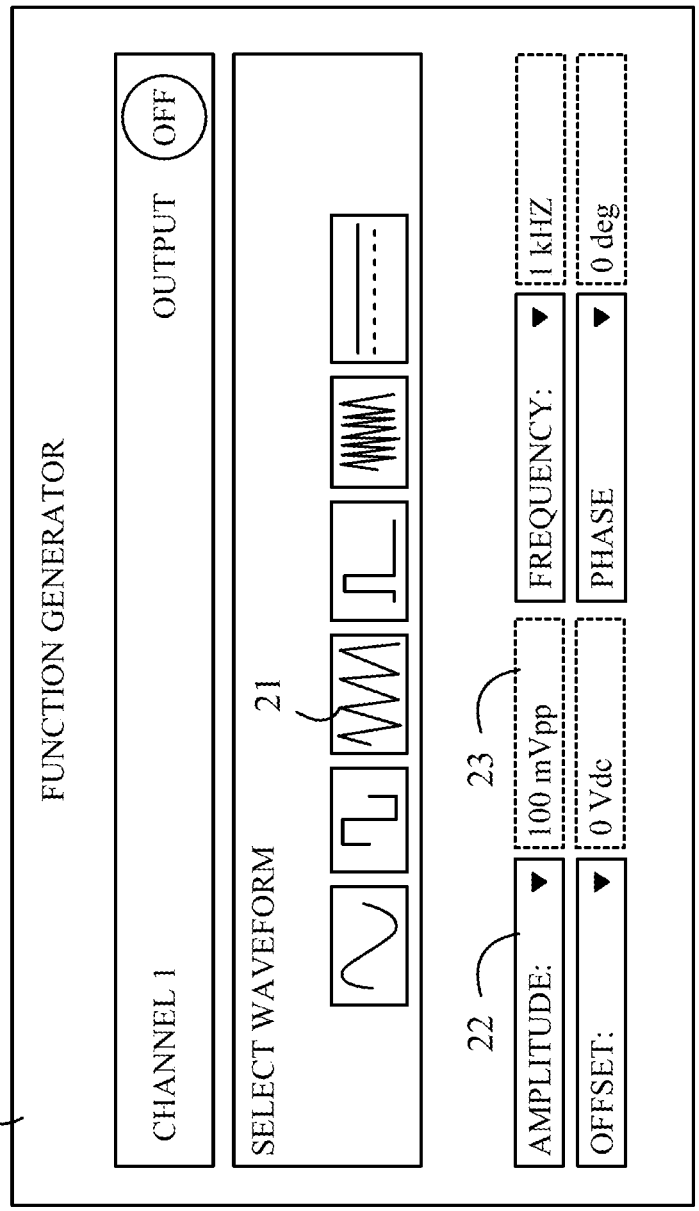
FIG. 1 illustrates a representation of a function generator that is adapted for use in a virtual workbench.

The manner in which the present invention provides its advantages can be more easily understood with respect to a simple experiment in which a device under test (DUT) is connected to a signal source and the output of the DUT is recorded by an oscilloscope. The signal source, i.e., a function generator, is manually connected to the DUT on the workbench and the output of the DUT is connected to the oscilloscope. The function generator and the oscilloscope are connected to a computer that is running a virtual workbench. In general, the physical instrument has a control panel that can include a number of physical control elements such as knobs, sliders, display screens, etc. A user of the physical instrument interacts with the physical instrument by manipulating these physical control elements. In addition, physical instruments can also have control elements that are only accessed through a communication interface by a computer. The control of these elements is often provided by a web page that is accessed via a browser. The web page provides virtual controls that appear as buttons or other elements that can be activated using a pointing device or user interface.

For the purposes of the present discussion, a virtual workbench is defined to be a computer program which displays virtual instruments corresponding to the physical instruments on the user's workbench and allows the physical instruments to be controlled by manipulating elements on the virtual instruments using a GUI. A virtual instrument includes a representation of a control panel with one graphical element for each control element of the physical instrument.

To set up the experiment involving a function generator and an oscilloscope the user drags a virtual function generator and virtual oscilloscope into a display on the virtual workbench. The user can then control the instruments by controlling the graphical elements on the virtual instruments. For example, the user can change the input frequency and amplitude of the output of the function generator by manipulating virtual knobs on the virtual instrument representing the function generator and see the results in a window on the virtual oscilloscope. This form of control does not require any programming expertise, and hence, is well suited for laboratory personnel who lack programming skills.

If the measurement requires only one set of parameters, this system is adequate for many applications. However, many measurements require that one or more of the controls be cycled through a number of different values and the results recorded for each set of values. For example, the frequency and amplitude of the output of the function generator might need to be cycled through a plurality of different values in a predetermined order.

To automate such measurements, some form of programming language must be utilized to cause the corresponding instruments to cycle through the desired values and to record the results. In principle, a visual programming system can be used instead of the virtual workbench. For the purposes of the present discussion, a visual programming language is defined to be a programming language in which the user creates programs by manipulating program elements graphically rather than by specifying the operations in a textually based language that requires a knowledge of the syntax of a conventional programming language such as C or BASIC. While a visual programming language can relieve the user of the problems associated with building a program using text-based programming languages, the visual representations used to represent the instruments in prior art visual programming languages do not have the same intuitive visual features of the visual representations of the instruments used in a virtual workbench. In general, an instrument in a visual programming language is represented by a instrument block having pins that can be connected to other instrument blocks in the program. To set a value for a control, the corresponding pin is wired to a block that sets the value. The instrument blocks do not have the same intuitive structure as the representations used in a virtual workbench, and hence, a user of a virtual workbench is subjected to a substantial learning curve in moving from the virtual workbench environment to the virtual programming environment.

A second problem with the visual programming language representations of an instrument relates to the number of "pins" that must be provided for making control connections to the virtual instrument. In a visual programming language there is one pin per control. However, in many experiments, only a small subset of these inputs needs to be connected to a control that causes a value to change during the running of the program. Dealing with the unused pins detracts from the intuitive nature of virtual instruments used in virtual workbenches.

The present invention overcomes these problems by providing instrument representations for a visual programming language which have the same intuitive appearance and control as the representations used in a virtual workbench display. Specific controls and outputs whose values are to be controlled by the program are specified by associating those controls to pins in connection regions that are added to the virtual instrument representation.

Refer now to FIG. 1, which illustrates a virtual instrument representation of a function generator that is adapted for use in a virtual workbench. Representation 20 has a general appearance that matches the appearance of the physical function generator that would be used by the experimenter. Representation 20 includes a plurality of "buttons" that set the waveform generated by the function generator. A typical waveform selection button is shown at 21. When the user "presses" this button by clicking on the button with a pointing device such as a mouse or touching the button on a touch screen enabled display, the corresponding function on the actual function generator is activated as if the user pushed a corresponding button on the physical instrument. Similarly, the user can set the amplitude of the output signal by typing a value into window 23.

While the virtual workbench provides a convenient intuitive system for controlling various instruments, it is not well suited for automating tests that require the coordination of multiple instruments or the cycling through of a large number of settings on one or more of the instruments. Reducing errors in such settings presents challenges. In addition, it would be advantageous to provide a mechanism for repeating a test at some later date by different personnel.

To provide such a solution in a manner that does not require expertise in a textual programming language, a visual programming language provides an attractive alternative. In a visual programming language, the user would place "instrument blocks" representing the function generator and the oscilloscope on the display and connect the various inputs and outputs by "wires". Programming the function generator to cycle through a set of frequencies is then accomplished by connecting the input for frequency to a loop control that executes a loop that is equivalent to a "FOR" or "WHILE" loop in a conventional programming language.

Unfortunately, the normal model for the blocks in a conventional visual programming language presents challenges when the component is to represent an instrument having a large number of possible inputs and/or outputs and still provide the type of intuitive interface of a workbench representation of the instrument. In a visual programming language, the inputs and outputs of a component are accessed via "pins" on the edges of the block. Here, it is important to distinguish between inputs and outputs that correspond to control variables as opposed to electrical signals processed by the instrument. The electrical output of a function generator or the electrical input to a channel of an oscilloscope are not represented by pins. Pins are used for inputs such as the amplitude control shown at 22 in FIG. 2. An output pin corresponding to amplitude control 22 could also be defined. That pin would carry the digital value of the current setting for amplitude control 22.

Each possible input has a corresponding pin, typically on one side of the representation. Similarly, each possible output has a corresponding pin on another side of the representation. Consider the function generator representation shown in FIG. 1. A visual programming language representation of the function generator would have one pin corresponding to the waveform buttons and a pin for each of the amplitude, frequency, offset, and phase controls. In addition to being associated with input pins, these controls could be outputs for reading the associated value and using that read value as an input to some other control pin. This large number of pins can result in connection errors when the user attempts to wire a control to a specific pin. In addition, the abstraction of the pins for the controls results in a less intuitive presentation. For example, setting the waveform from a list of possible waveforms attached to a control that is wired to a waveform pin is less intuitive than just pushing a corresponding button on the virtual instrument. In addition, the number of pins can present challenges even for the simple case of a function generator, which could have 30 pins in some cases. With more complex instruments such as oscilloscopes, the number of pins becomes even more of a problem.

A visual programming language block for an instrument according to the present invention provides the advantages of the GUI of a virtual workbench representation of the instrument with pins that allow the instrument block to be wired to other controls in the program. Only the pins that are actually going to be used in the program need to be defined, as pins can easily be added and removed during the editing phase of the programming.

Figure 2:
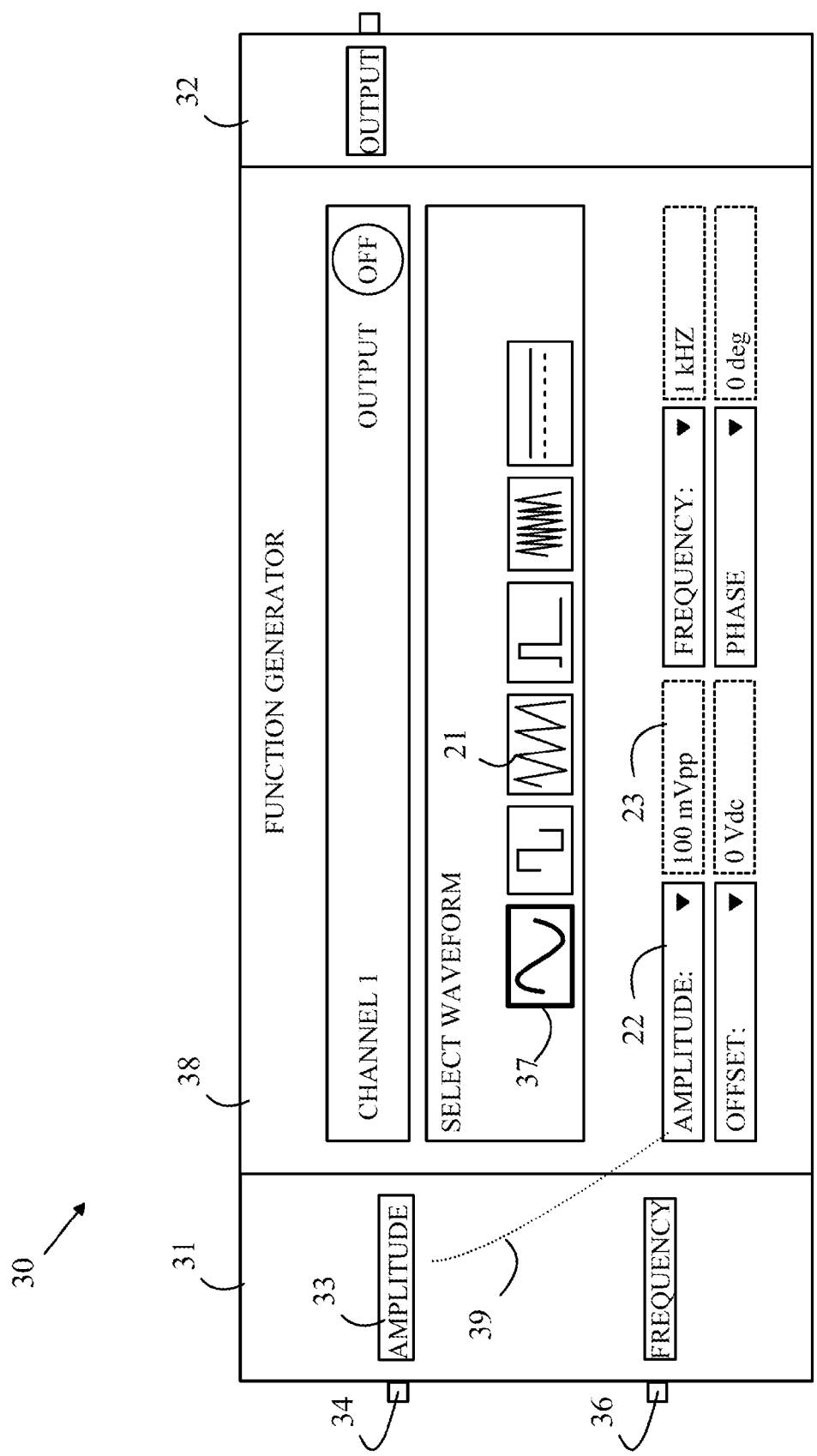
FIG. 2 illustrates a graphical representation for the function generator shown in FIG. 1 according to the present invention for use in a visual programming language environment.

Refer now to FIG. 2, which illustrates a virtual programming instrument block for the function generator shown in FIG. 1 according to one embodiment of the present invention. Instrument block 30 includes GUI 38 that is similar to representation 20 discussed above. The user can manually control any of the instrument functions shown in instrument block 30 by "pushing" a corresponding button using a pointing device or by typing a numeric value into the appropriate field. For example, the sine wave button has been activated as shown by the bold representation of the corresponding button 37.

Instrument block 30 also includes two connection regions shown at 31 and 32. Input connection region 31 provides pins for the inputs that are actually going to be changed by the program during a measurement. These input pins can be connected to program elements that cause the input to cycle through a set of values or to the outputs of other instruments in the measurement solution. The user associates a particular control in GUI 38 with a pin in input connection region 31 during the design phase of the visual program. These pins are then connected to other pins in the program by wires during the design phase of the visual program. For example, to provide an input pin for the amplitude control, the user clicks on a corresponding amplitude control 22 in GUI 38 and drags the representation into input connection region 31 as shown by the broken line at 39. The visual programming language then generates a label 33 and a pin 34 corresponding to amplitude control 22. Similarly, the user can provide an input pin 36 corresponding to the frequency control.

Similarly output connection region 32 provides pins for the outputs from the instruments that are to be connected to other components in the measurement solution. A pin in output connection region 32 is created in a manner analogous to that described above with respect to the creation of input pins. A pin can be deleted by selecting the pin and hitting the "delete" key. Since pins can be added or deleted during the design phase of the visual program, a single virtual instrument display can be used to represent the physical instrument without requiring that the user work with unwanted pins.

Figure 3:
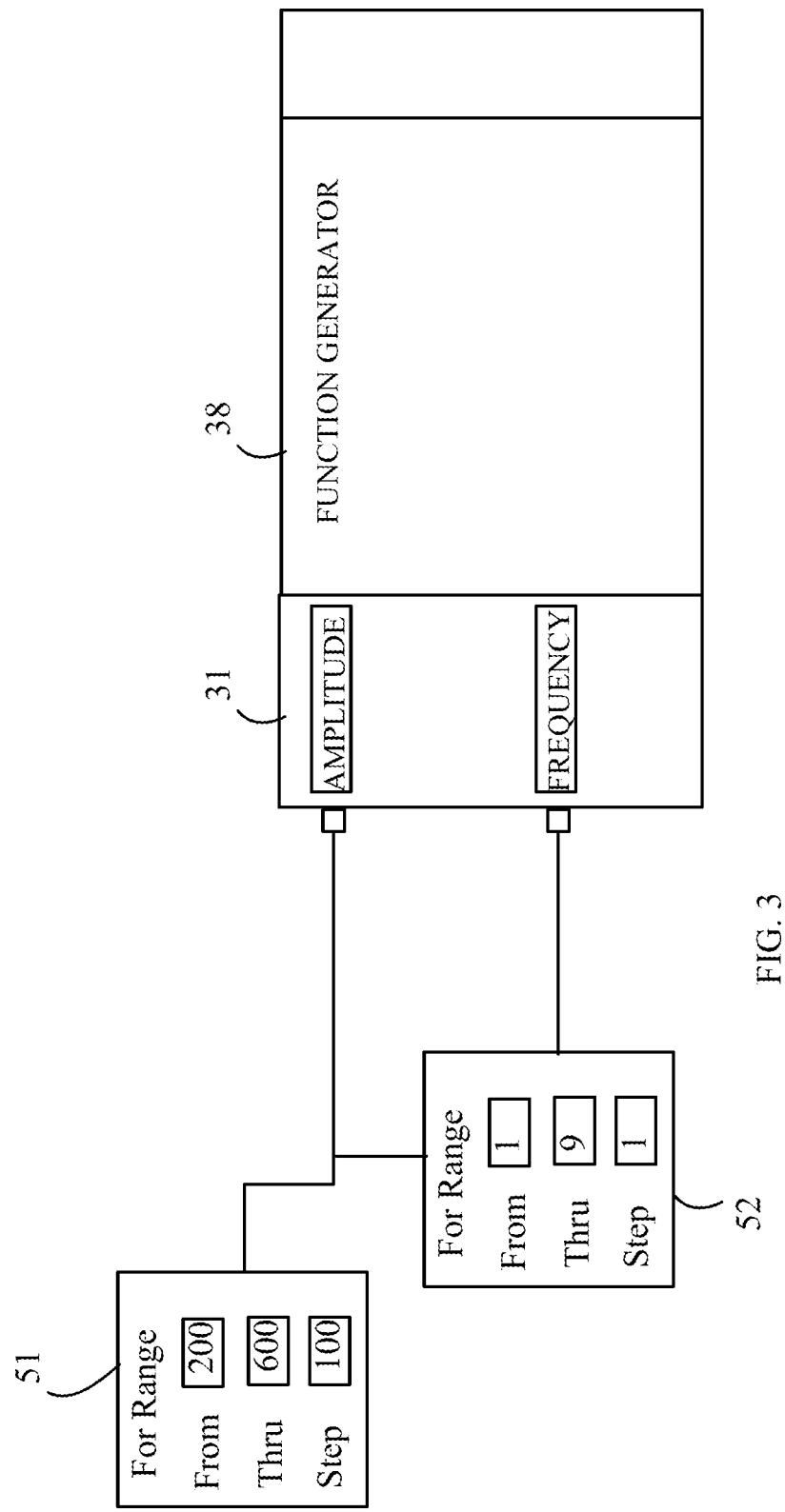
FIG. 3 illustrates the manner in which the input pins can be connected to programming elements that cycle through a set of values for amplitude and frequency.

Refer now to FIG. 3, which illustrates the manner in which the input pins can be connected to programming elements that cycle through a set of values for amplitude and frequency. The visual programming language provides a programming element that serves the function of a "FOR" loop in a conventional linear programming language. Two such elements are shown at 51 and 52. The outputs of these elements are connected to the amplitude and frequency pins in input connection region 31. The frequency control shown at 52 is the inner most loop. That is, the frequency control cycles through its values before the amplitude control increments to its next value.

Any control whose value remains constant during the running of the program can be set manually by interacting with GUI 38 in a manner analogous to that used to specify that function in a virtual workbench. Hence, if the waveform is to be set to a sine wave, button 37 shown in FIG. 2 is "pressed" during the design phase of the visual program.

Figure 4:
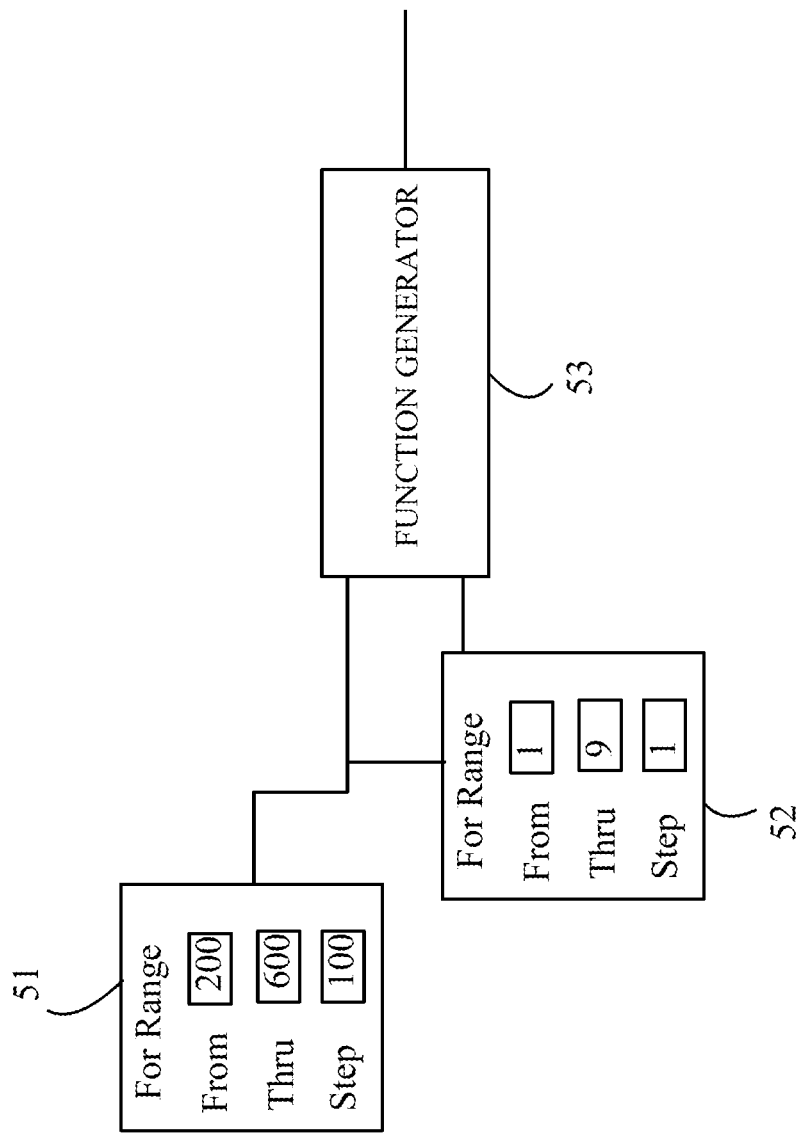
FIG. 4 illustrates the use of an icon to reduce the space needed to represent an experimental setup in a visual programming language.

The amount of space on the display required to show all of the controls of an instrument is significant. Accordingly, in one aspect of the present invention, each instrument block representation includes an icon representation that only shows the external connections to save space. Refer now to FIG. 4, which illustrates the use of such an icon to reduce the space needed to represent an experimental setup in a visual programming language. In FIG. 4, the function generator instrument block representation has been replaced by an icon 53 that only shows the external connections. When a user wishes to manually change an input to the function generator, the user selects icon 53 and selects the expanded view from a corresponding menu or other action such as double clicking on icon 53.

Refer now to FIG. 5, which illustrates an exemplary layout screen for a visual programming language that utilizes the instrument block representations of the present invention. Layout screen 60 includes three regions shown at 61-63. Region 61 includes various tool bars that provide functions such as run-time controls. Region 62 includes a plurality of icons that represent instrument blocks that can be used to construct a visual program. Exemplary icons are shown at 64A-64C. Region 63 is used to construct the visual program by dragging icons from region 62 into region 63. When an icon has been placed in region 63, the icon is expanded to the full representation of the instrument block. The various pins and connections are then provided while working with the full representation instrument block. When more space is needed, the instrument blocks that have already been wired are reduced to the icons discussed above with reference to FIG. 3.

A visual program may include multiple instrument blocks that control the same physical instrument. The different instrument blocks may have different pins exposed to facilitate setup operations in the running program. The different instrument blocks could also be the same, but represent operations in different parts of the program. Since these multiple instrument blocks all control the same physical instrument, a mechanism for ensuring that the underlying instrument parameters are synchronized between instrument blocks is required. In one aspect of the invention, there are four relevant classes for a single instrument. For example, consider an application that utilizes a digital multi-meter (DMM). The classes associated with this instrument would be DMMInstrumentBlock class
DMMControlPanel class
DMMConnection class
DMMInstrumentModel class Each representation of this DMM is an instance of a compound object having instances of these classes as its component classes. An instance of an DMMInstrumentBlock class points to an instance of a DMMControlPanel class and an Instance of a DMMConnection class. For each DMM instrument block in the visual programming, there are separate instances of the DMMInstrumentBlock, DMMControlPanel, and DMMConnection. These instances are basically responsible for presenting the GUI for each instrument block to the user.

There is only one instance of the DMMInstrumentModel. The instrument model mediates between the GUI classes and the physical instrument, and typically keeps track of the instrument settings. When the user interacts with an instrument block, the three instances associated with the user block communicate the user interactions and feedback to/from the DMMInstrumentModel. The DMMInstrumentModel notifies all of the instances corresponding to DMM instrument blocks to update themselves accordingly. In the absence of concurrency only one instrument block can execute at a time, so there is no logical or timing problem with having multiple instrument blocks for the same instrument.

Other methods for dealing with multiple representations of the same physical instrument in a program can be also be utilized. In general, the actual state of the physical instrument is controlled through a set of parameters that represent the state of the instrument and its controls. As long as the control parameters that actually set the state of the instrument are either shared between the various representations or synchronized between the representations when one representation results in one of the parameters being changed, multiple representations can be utilized.

In the above-described embodiments, the instrument blocks have a "flat" structure in that all of the controls in the GUI section are shown at once. However, more complex blocks having a layered structure where interface elements are exposed as needed can be utilized. For example, there could be tabs for various sub-components that are exposed when the tab is selected. In addition, the GUI of the instrument block could be adjusted to provide different size GUIs to more efficiently accommodate different display panel sizes of the computer on which the program is to be run.

The present invention can be practiced on a data processing system that runs a visual programming language development platform that has been modified to include the virtual instrument representations of the present invention. The present invention also includes computer readable media that stores instructions that cause a data processing system to utilize virtual instrument representations according to the present invention in a program running on that data processing system or a program generated by a program development environment running on that data processing system. The program may also take the form of a component that defines a block in an existing visual programming language. Exemplary visual programming development systems include LabView from National Instruments and VEE from Keysight Technologies. An exemplary visual workbench is BenchVue from Keysight Technologies.

A computer readable medium is defined to be any medium that constitutes patentable subject matter under 35 U.S.C. 101 and excludes any media that is not patentable subject matter under 35 U.S.C. 101. Examples of such media include non-transitory media such as computer memory devices that store information in a format that is readable by a computer or data processing system.

The above described embodiments of the present invention have utilized instrument blocks that represent test instruments of the type used in electronic measurements. However, instrument blocks according to the present invention could also be utilized to represent other components for which a GUI provides a more intuitive mechanism for controlling particular functions associated with the instrument block. For example, a relay panel used to remotely control various circuits in a plant or home environment is often represented by a GUI that is presented in a web browser environment. The user of this interface can control the relays manually by pressing various buttons or programming constants that determine various button activated functions such as a length of time a relay is to be pulsed. A visual program that utilizes an instrument block according to the present invention can be constructed to provide more complex controls. The relays that are to be controlled through the program by wiring to programming blocks would have pins defined for those controls. The user could also manually operate the relays by pressing the corresponding buttons in the GUI for the instrument block. The GUI preferably matches the GUI in the web browser interface so that the user has a minimal learning curve in moving from the web browser to the visual program for controlling the relay panel.

Accordingly, the term "instrument block" is not limited to measurement instruments. In general, an instrument block is a visual programming block having a GUI region and a connection region. The GUI region comprises a plurality of GUI controls that can be actuated by selecting a control using a GUI interaction such as clicking on the control or entering text data into a box corresponding to the control. Activating a GUI control causes a corresponding physical change in a physical apparatus, "the instrument". The control region includes a pin that can be wired to other pins in the visual programming system. A pin corresponding to one of the GUI controls can be introduced into the connection region by selecting the GUI control during the design phase of the visual program and performing a predetermined action such as dragging the control to the connection region.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims

What is claimed is:

1. A method of operating a data processing system running a visual programming language program development system to provide a virtual instrument that represents a physical instrument having a plurality of controls disposed in a layout pattern relative to one another in a visual program, said method comprising providing an instrument block corresponding to said physical instrument in said visual programming language, said instrument block comprising:

a GUI control panel display having a plurality of virtual controls, each of said plurality of virtual controls causing said physical instrument to execute a function that alters a physical state of said physical instrument, said physical instrument being separate from said data processing system; and a connection region associated with said GUI control panel display, said connection region having a pin that is associated with one of said plurality of virtual controls and provides a programming interface for connections to other pins in said visual program, wherein an association between said one of said plurality of virtual controls and said pin is provided in response to user input during a design phase of said visual program, said user input identifying one of said virtual controls in said GUI control panel display and said pin, said GUI control panel display and said connection region being visible to said user during the creation of said visual program, said data processing system compiling a control program containing said instrument block to a program that controls said physical instrument through said virtual controls in a GUI having said GUI control panel when said physical instrument is connected to a processor running said program.

2. The method of claim 1 wherein said connection region comprises a first sub-region for pins that are associated with inputs to said instrument block and a second sub-region displaced from said first sub-region for pins that are associated with outputs from said virtual instrument.

3. The method of claim 1 wherein said instrument block further comprises a compact instrument block display in which said instrument block is represented by an icon having said pins but missing said GUI control panel display, said compact instrument block display replacing said GUI control panel display, said compact instrument block display being utilized in response to user input and said compact instrument block display requiring less area on said visual programming language program development system than said instrument block.

4. The method of claim 1 wherein one of said plurality of virtual controls that is not associated with one of said pins can be manipulated by a user interacting with said one of said plurality of virtual controls, said one of said plurality of virtual controls changing a corresponding physical parameter on said physical instrument.

5. The method of claim 1 wherein said physical instrument includes a physical control panel having a plurality of physical controls and wherein said plurality of virtual controls in said GUI control panel display has one virtual control for each of said plurality of physical controls.

6. The method of claim 5 wherein said plurality of physical controls are arranged in a pattern with respect to one another on said physical instrument and wherein said virtual controls are arranged in substantially the same pattern.

7. The method of claim 1 wherein said physical instrument that is to be controlled through said instrument block can be controlled separately through multiple instances of said instrument block, each of said multiple instances of said instrument block referencing a different set of control parameters that determine a state of said physical instrument, each of said multiple instances of said instrument block updating said set of control parameters.

8. A computer readable medium comprising instructions that cause a visual programming language development system running on a data processing system to represent a physical instrument having a plurality of controls disposed in a layout pattern relative to one another in a visual program, said representation comprising an instrument block corresponding to said physical instrument, said instrument block comprising:
- a GUI control panel display having a plurality of virtual controls, each of said virtual controls causing said physical instrument to execute a function that alters a physical state of said physical instrument, said physical instrument being separate from said data processing system; and
- a connection region associated with said GUI control panel display, said connection region having a pin that is associated with one of said plurality of virtual controls and provides a programming interface for connections to other pins in said visual program, wherein an association between said one of said virtual controls and said pin is provided in response to user input during a design phase of said visual program, said user input identifying one of said virtual controls in said GUI control panel display and said pin, said GUI control panel display and said connection region being visible to said user during creation of said visual program,
- said data processing system compiling a control program containing said instrument block to a program that controls said physical instrument through said virtual controls in a GUI having said GUI control panel when said physical instrument is connected to a processor running said program.

9. The computer readable medium of claim 8 wherein said connection region comprises a first sub-region for pins that are associated with inputs to said instrument block and a second sub-region displaced from said first sub-region for pins that are associated with outputs from said virtual instrument.

10. The computer readable medium of claim 8 wherein said instrument block further comprises a compact instrument block display in which said instrument block is represented by an icon having said pins but missing said GUI control panel display, said compact instrument block display replacing said GUI control panel display, said compact instrument block display being utilized in response to user input and said compact instrument block display requiring less area on said visual programming language program development system than said instrument block.

11. The computer readable medium of claim 8 wherein one of said plurality of virtual controls that is not associated with one of said pins can be manipulated by a user interacting with said one of said plurality of virtual controls, said one of said plurality of virtual controls changing a corresponding physical parameter on said physical instrument.

12. The method of claim 8 wherein said physical instrument includes a physical control panel having a plurality of physical controls and wherein said plurality of virtual controls in said GUI control panel display has one virtual control for each of said plurality of physical controls.

13. The computer readable medium of claim 12 wherein said plurality of physical controls are arranged in a pattern with respect to one another on said physical instrument and wherein said virtual controls are arranged in substantially the same pattern.

14. The computer readable medium of claim 8 wherein a-said physical instrument that is to be controlled through said instrument block can be controlled separately through multiple instances of said instrument block, each of said multiple instances of said instrument block referencing a different set of control parameters that determine a state of said physical instrument, each of said multiple instances of said instrument block updating said set of control parameters.

* * * * *